Aug. 7, 1951  F. S. RIGGS  2,563,748
BEVEL SEAT RIM
Filed Sept. 27, 1943
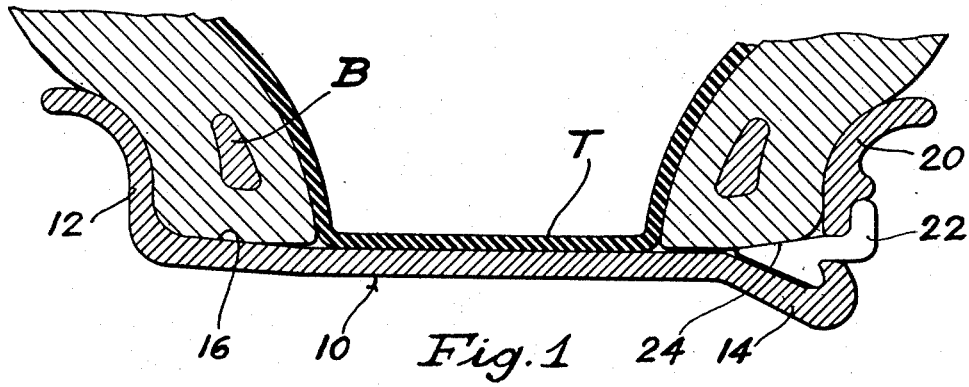
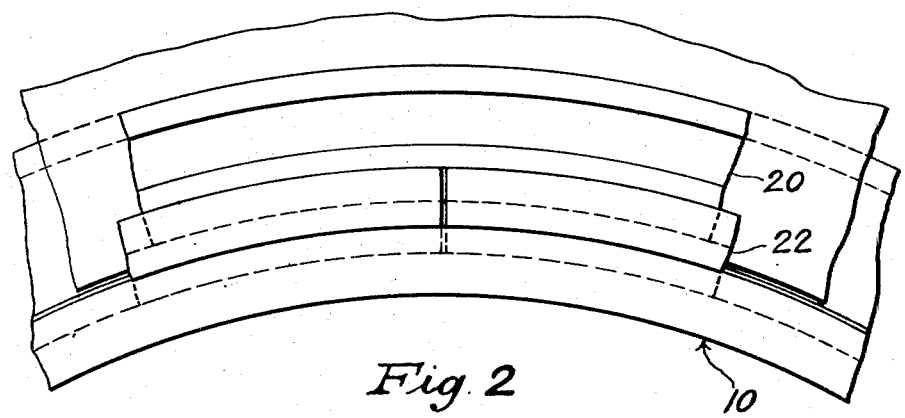
Inventor
F. Stanley Riggs
By
Attorney Patented Aug. 7, 1951

2,563,748

UNITED STATES PATENT OFFICE 2,563,748

BEVEL SEAT RIM

Frederick Stanley Riggs, Akron, Ohio, assignor to Wingfoot Corporation, Akron, Ohio, a corporation of Delaware Application September 27, 1943, Serial No. 504,021

8 Claims. (Cl. 152—410)

This invention relates to rims, and, more particularly, to endless base rims with a removable side ring for mounting a straight-sided, pneumatic tire of the open-bead type.

Heretofore, rims have been manufactured of the drop center type, including integral bead-seats for mounting the beads of a straight-sided pneumatic tire. There is no problem in providing beveled rim seats on a drop center rim, but when it becomes advisable to provide such seats upon removable side flange rims, and specifically upon rims including endless base portions, endless removable side rings and split locking rings, considerable difficulty is experienced, not only in recognizing the problem but in providing the solution.

It is the general object of the invention to provide a rim of the endless base, endless removable side flange, split locking ring type, which includes beveled seats for supporting the beads of a straight-sided, open-beaded penumatic tire.

Another object of the invention is to provide a multi-part rim, particularly adapted to direct and positive transmission of load to and from the tire mounted thereon.

Another object of the invention is the provision of a rim for an open-beaded, straight-sided pneumatic tire, such a rim including an endless base portion, a removable endless side flange, and a split locking ring, the locking ring including a beveled seat for one of the tire beads.

Another object of the invention is the provision of a mounting rim structure particularly adapted to be used in conjunction with relatively large and heavy tires requiring a removable side flange, with the rim providing beveled seats for receiving and rigidly supporting the tire beads of the pneumatic tire.

The foregoing and other objects of the invention are achieved by the provision of a rim including an endless base portion having an integral flange at one side and a gutter at the other, a split tire-retaining ring removably received in the gutter, a beveled seat for a tire bead on the ring, and a beveled seat for a tire bead on the base portion adjacent to the flange.

For a better understanding of the invention, reference should be had to the accompanying drawings wherein Figure 1 is a fragmentary cross-sectional view of a particular rim embodiment incorporating the principles of the invention; and Figure 2 is a fragmentary side elevation of the rim structure illustrated in Figure 1.

More particularly, in the specific form of the invention illustrated in the drawings, the numeral 10 indicates generally an endless base rim portion having an integral side flange 12, usually adjacent its inboard side, and an integral gutter 14, ordinarily adjacent the outboard side of the base portion. The rim base portion 10 is provided with a beveled seat 16 adjacent the flange 12, and this seat serves to mount the bead B of a straight-sided, open-beaded pneumatic tire, such tire being shown in the drawings as partially broken away.

Associated with the gutter 14 of the rim base portion is an endless side flange or ring 20, which has an internal diameter of a size slightly larger than the external diameter of the base portion 10 and gutter 14, so that the side ring will slide freely in a lateral direction on and off the base portion.

A split locking ring 22 of the cross-sectional contour shown, having a portion complementary to the gutter 14, is adapted to be snapped into and out of the gutter to lock the side ring 20 in place. The split locking ring 22 has a beveled seat 24 formed thereon, which is adapted to mount the other bead B of the pneumatic tire in wedged relation with the side ring 20. An inner tube T is normally provided inside the tire.

It is believed that the operation of the structure will be apparent from the foregoing description. However, briefly reviewing the manner of mounting a tire, with the side ring 20 and lock ring 22 removed, it is a simple matter to slide a tire and tube over the rim base portion. Then the side ring 20 is moved laterally onto the base portion 10, the beads B of the tire yielding inwardly toward each other until the split locking ring 22 can be moved over and dropped down into the gutter 14. Thereupon the side ring 20 is allowed to move back over the locking ring to secure it in place in the gutter. Inflation of the inner tube T then forces the beads B outwardly onto the seats 16 and 24 in wedged relation thereon to provide very positive support between the tire and rim. The tire is removed from the rim by a reversal of the operations described.

From the foregoing it will be recognized that the objects of the invention have been achieved by the provision of an improved, relatively inexpensive, easily operated, and long wearing rim which provides particularly positive transmission of tire-rim loads. A new and useful rim combination is provided including an endless base portion, a removable endless side flange, and a split locking ring, and with the locking ring and base portion each having a beveled seat for mounting the bead of a pneumatic tire.

While, in accordance with the patent statutes, one form of the invention has been illustrated and described in detail, it should be particularly understood that the invention is not to be limited thereto or thereby, but that the scope of the invention is defined in the appended claims.

What is claimed is:

1. A rim assembly for pneumatic tires comprising a rim having an endless, generally cylindrical base portion at one end of which is formed an integral gutter, integrally formed side flange at the end of the rim opposite the gutter, and a beveled tire bead seat portion adjacent the flanged end of increasingly greater diameter than the base portion in the direction of the flange; a split locking ring having a portion thereon for interlocking engagement with the gutter on the rim and a beveled tire bead seat portion corresponding generally to that of the rim but of increasingly greater diameter in a direction opposite thereto; and an endless ring interfitting with and supported by the locking ring.

2. A rim assembly for pneumatic tires comprising a rim having an endless, generally cylindrical base portion at one end of which is formed an integral gutter, integrally formed side flange at the end of the rim opposite the gutter, and a beveled tire bead seat portion adjacent the flanged end of increasingly greater diameter than the base portion in the direction of the flange; a split locking ring having a portion thereon for interlocking engagement with the gutter, a beveled tire bead seat portion adjacent the locking portion and an annular abutment at one extremity of the seat portion; and an endless side ring supported by the locking ring and held in place by the abutment thereon.

3. A rim assembly for pneumatic tires comprising a rim having an endless, generally cylindrical base portion, a beveled tire bead seat portion formed integrally with the base portion at one end thereof and flared outwardly therefrom, a flange portion integral with the seat portion, and a gutter formed at the other end of the base portion; a split locking ring for engagement with the gutter having a beveled tire bead seat portion thereon which, when the ring is in place, decreases in diameter inwardly toward the base portion of the rim; and an endless side ring engaging the locking ring and supported thereby adjacent the seat portion thereon.

4. A separable rim assembly for pneumatic tires comprising an endless annular rim base, an endless tire bead retaining side flange formed integrally with and extending radially outwardly from one side of the rim base, a beveled annular tire bead seat formed integrally with the rim base adjacent the side flange and decreasing in diameter laterally inwardly, a radially outwardly facing annular channel formed in the rim base adjacent the opposite side of the rim base, a radially extending locking flange formed integrally with said opposite side of the rim base and forming the outer side of the channel, a demountable transversely split ring having a locking portion removably seating in the channel in the rim base and adapted to be locked against laterally outward displacement by the locking flange, a beveled tire bead seat formed integrally with the split ring and having a bevel decreasing in diameter laterally in a direction opposite to the bevel of the bead seat formed integrally with the rim base, an endless tire bead retaining side flange demountibly supported by the split ring laterally outwardly adjacent the beveled bead seat of the split ring and adapted to be displaced laterally inwardly off the split ring over the portion of the rim base laterally inwardly of the channel when the split ring is being mounted on and demounted from the rim base and a radially outwardly extending annular retaining abutment formed integrally with the split ring laterally outwardly adjacent the seating position of the side flange ring on the split ring and adapted to hold the side flange ring against laterally outward displacement of the split ring.

5. A separable rim assembly for pneumatic tires comprising an endless annular rim base, an endless tire bead retaining flange formed integrally with and extending radially outwardly from one side of the rim base, a beveled annular tire bead formed integrally with the rim base adjacent the side flange and decreasing in diameter laterally inwardly, a radially outwardly facing annular channel formed in the rim base adjacent the opposite side of the rim base, a radially extending locking flange formed integrally with said opposite side of the rim base and forming the outer side of the channel, a demountable transversely split ring having a locking portion removably seating in the channel in the rim base and adapted to be locked against laterally outward displacement by the locking flange, a beveled tire bead seat formed integrally with the split ring and having a bevel decreasing in diameter laterally in a direction opposite to the bevel of the bead seat formed integrally with the rim base, a cylindrical seat formed integrally with the split ring laterally outwardly adjacent the beveled bead seat of the split ring, an endless tire bead retaining flange ring removably supported on the cylindrical seat of the split ring and adapted to be displaced laterally inwardly off the split ring over the portion of the rim base laterally inwardly of the channel when the split ring is being mounted on and demounted from the rim base, and a radially outwardly extending annular retaining abutment formed integrally with the split ring laterally outwardly adjacent the cylindrical seat of the split ring and adapted to hold the side flange ring against laterally outward displacement off the split ring.

6. A separable rim assembly for pneumatic tires comprising an endless annular rim base, an endless tire bead retaining side flange formed integrally with and extending radially outwardly from one side of the rim base, a beveled annular tire bead seat formed integrally with the rim base adjacent the side flange and decreasing in diameter laterally inwardly, a radially outwardly facing annular channel formed in the rim base adjacent the opposite side of the rim base, a radially extending locking flange formed integrally with said opposite side of the rim base and forming the outer side of the channel, a demountable transversely split ring having a locking portion removably seating in the channel in the rim base and adapted to be locked against laterally outward displacement by the locking flange, a beveled tire bead seat formed integrally with the split ring and having a bevel decreasing in diameter laterally in a direction opposite to the bevel of the bead seat formed integrally with the rim base, an endless tire bead retaining side flange ring of greater interior diameter than the outer diameter of the portion of the rim base laterally inwardly adjacent the channel, an annular seat of greater diameter than said portion of the rim base formed integrally with the split ring laterally outwardly adjacent the beveled bead seat of the split ring and removably supporting the flange ring on the split ring, the flange ring being adapted to be displaced inwardly off the split ring over said portion of the rim base when the split ring is being mounted on and demounted from the rim base, and a radially outwardly extending annular retaining abutment formed integrally with the split ring outwardly adjacent the flange ring supporting seat and adapted to hold the side flange ring against laterally outward displacement off the split ring.

7. A separable rim assembly for pneumatic tires comprising an endless annular rim base, an endless tire bead retaining side flange formed integrally with and extending radially outwardly from one side of the rim base, a beveled annular tire bead seat formed integrally with the rim base adjacent the side flange and decreasing in diameter laterally inwardly, a radially outwardly facing annular channel formed in the rim base adjacent the opposite side of the rim base, a radially extending locking flange formed integrally with said opposite side of the rim base and forming the outer side of the channel, a demountable transversely split ring having a locking portion removably seating in the channel in the rim base and adapted to be locked against laterally outward displacement by the locking flange, a beveled tire bead seat formed integrally with the split ring and having a bevel decreasing in diameter laterally in a direction opposite to the bevel of the bead seat formed integrally with the rim base, the beveled bead seat of the split ring overlying the channel in the rim base and terminating in an edge at the inner side of the channel, at which edge said beveled bead seat of the split ring has the same diameter as the laterally inwardly adjacent portion of the annular rim base, an endless tire bead retaining side flange ring demountably supported by the split ring laterally outwardly adjacent the beveled bead seat of the split ring and adapted to be displaced laterally inwardly off the split ring over the portion of the rim base laterally inwardly of the channel when the split ring is being mounted on and demounted from the rim base and a radially outwardly extending annular retaining abutment formed integrally with the split ring laterally outwardly adjacent the seating position of the side flange ring on the split ring and adapted to hold the side flange ring against laterally outward displacement off the split ring.

8. A separable rim assembly for pneumatic tires comprising an endless annular rim base, an endless tire bead retaining side flange formed integrally with and extending radially outwardly from one side of the rim base, a beveled annular tire bead seat formed integrally with the rim base adjacent the side flange and decreasing in diameter laterally inwardly, a radially outwardly facing annular channel formed in the rim base adjacent the opposite side of the rim base, and having an inclined wall which decreases in diameter laterally outwardly and which at its inner edge is of the same diameter as the portion of the annular rim base laterally inwardly adjacent the channel, a radially extending locking flange formed integrally with the split ring at the outer edge of said inclined wall and forming the outer side of the channel, a transversely split wedge-shaped ring having oppositely-inclined lower and upper annular surfaces which converge to a narrow edge of the same diameter as the portion of the annular rim base laterally inwardly adjacent the channel, the lower portion of the split ring removably seating in the channel with the lower inclined annular surface seating on the inclined wall of the channel, a radially extending locking surface integral with and extending radially outwardly from the opposite edge of said inclined lower annular surface of the split ring and locking with the locking flange of the channel so as to hold the split ring against laterally outward displacement, the inclined upper annular surface of the split ring forming a beveled tire bead seat of opposite bevel to the bevel of the beveled bead seat formed integrally with the rim base, and merging at the narrow edge of the split ring with the portion of the rim base laterally inwardly adjacent the channel, an endless tire bead retaining side flange ring, an annular seat formed integrally with the split ring removably supporting the side flange ring laterally outwardly adjacent the beveled bead seat on the split ring, the side flange ring being adapted to be displaced laterally inwardly off the split ring over the portion of the rim base laterally inwardly of the channel when the split ring is being mounted on and demounted from the rim base, and a radially outwardly extending annular retaining abutment formed integrally with the split ring outwardly adjacent the side flange ring seat and adapted to hold the side flange ring against laterally outward displacemet off the split ring.

FREDERICK STANLEY RIGGS.

REFERENCES CITED

The following references are of record in the file of this patent:

UNITED STATES PATENTS

| Number | Name | Date |
|---|---|---|
| 899,856 | Baker | Sept. 29, 1908 |
| 1,493,040 | Klaus | May 6, 1924 |
| 1,499,739 | Klaus | July 1, 1924 |
| 2,149,205 | Brink | Feb. 28, 1939 |
| 2,219,156 | Yankee | Oct. 22, 1940 |
| 2,367,823 | Brink | Jan. 23, 1945 |

FOREIGN PATENTS

| Number | Country | Date |
|---|---|---|
| 834,215 | France | 1938 |